United States Patent
Saito et al.

(10) Patent No.: US 10,763,725 B2
(45) Date of Patent: Sep. 1, 2020

(54) ELECTRIC ACTUATOR

(71) Applicant: NIDEC TOSOK CORPORATION, Kanagawa (JP)

(72) Inventors: Kazuhiro Saito, Kanagawa (JP); Hiroaki Takahashi, Kanagawa (JP); Tadayuki Hatsuda, Kanagawa (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 15 days.

(21) Appl. No.: 16/382,158

(22) Filed: Apr. 11, 2019

(65) Prior Publication Data

US 2019/0319511 A1    Oct. 17, 2019

(30) Foreign Application Priority Data

Apr. 13, 2018  (JP) ................................ 2018-077977

(51) Int. Cl.
| | | |
|---|---|---|
| *H02K 7/116* | (2006.01) | |
| *H02K 11/00* | (2016.01) | |
| *H02K 5/04* | (2006.01) | |
| *H02K 7/00* | (2006.01) | |

(52) U.S. Cl.
CPC ............. *H02K 7/116* (2013.01); *H02K 5/04* (2013.01); *H02K 7/003* (2013.01); *H02K 11/0094* (2013.01)

(58) Field of Classification Search
CPC ....... H02K 7/116; H02K 5/00; H02K 11/0094
USPC ..................... 310/68 R, 83, 98, 99
See application file for complete search history.

(56) References Cited

U.S. PATENT DOCUMENTS

| | | | | |
|---|---|---|---|---|
| 6,028,384 A | * | 2/2000 | Billman ............. | B60H 1/00835 251/129.11 |
| 7,291,951 B2 | * | 11/2007 | Takiguchi .............. | B60Q 1/076 310/67 R |
| 8,957,559 B2 | * | 2/2015 | Schneider ................ | H02K 5/16 310/43 |
| 8,978,379 B2 | * | 3/2015 | Gotoh ................... | F02B 37/186 310/80 |
| 10,371,257 B2 | * | 8/2019 | Kume ..................... | H02K 7/116 |
| 10,663,076 B2 | * | 5/2020 | Yamanaka .............. | F01D 17/10 |
| 2006/0181161 A1 | * | 8/2006 | Kawamoto .......... | H02K 7/1166 310/51 |

(Continued)

FOREIGN PATENT DOCUMENTS

JP    2014050159    3/2014

*Primary Examiner* — Jose A Gonzalez Quinones
(74) *Attorney, Agent, or Firm* — JCIPRNET

(57) ABSTRACT

There is provided an electric actuator including a motor part, a deceleration mechanism, an output part, and a housing. The housing has a housing main body and a lid member. An output shaft is positioned at a first corner of the housing. The lid member and the housing main body are fastened by bolts. The bolts include corner bolts positioned at respective corners of the housing other than the first corner and an intermediate position bolt positioned at the intermediate between the first corner and a second corner adjacent to the first corner. In a plane view, the intermediate position bolt is positioned on the side of the planar center with respect to an edge connecting the first corner and the second corner and on the side of an outer edge with respect to an imaginary line connecting the center of the output shaft and the second corner.

7 Claims, 4 Drawing Sheets

(56) References Cited

U.S. PATENT DOCUMENTS

| | | | |
|---|---|---|---|
| 2008/0141807 A1* | 6/2008 | Kimura | F16H 61/32 74/335 |
| 2012/0255385 A1* | 10/2012 | Nakayama | F16H 19/001 74/437 |
| 2015/0229172 A1* | 8/2015 | Kashihara | H02K 5/225 310/71 |
| 2015/0285373 A1* | 10/2015 | Nagahori | F16H 61/32 475/149 |
| 2016/0109022 A1* | 4/2016 | Uryu | F16H 37/065 475/5 |
| 2018/0128368 A1* | 5/2018 | Kurita | F16H 61/32 |

\* cited by examiner

ELECTRIC ACTUATOR

CROSS-REFERENCE TO RELATED APPLICATION

This application claims the priority benefit of Japan Application No. 2018-077977, filed on Apr. 13, 2018. The entirety of the above-mentioned patent application is hereby incorporated by reference herein and made a part of this specification.

BACKGROUND

Technical Field

The present disclosure relates to an electric actuator.

Description of Related Art

An electric actuator including a motor part, a deceleration mechanism connected to the motor part, and an output part to which rotation of the motor part is transmitted through the deceleration mechanism is known. For example, in Patent Document 1, an electric actuator mounted in an electronic throttle of a vehicle engine is disclosed.

PATENT DOCUMENTS

[Patent Document 1] Japanese Patent Laid-Open No. 2014-050159

SUMMARY

In the electric actuator described in Patent Document 1, a shaft that is driven by an electric actuator is positioned outside a motor in the radial direction. Therefore, a planar size of the electric actuator tends to increase in the radial direction of the motor.

According to an embodiment of the present disclosure, there is provided an electric actuator having a reduced planar size.

According to an embodiment of the present disclosure, there is provided an electric actuator including: a motor part having a motor shaft that extends in an axial direction; a deceleration mechanism that is connected to one side of the motor shaft in the axial direction or the other side in the axial direction; an output part having an output shaft to which rotation of the motor shaft is transmitted via the deceleration mechanism; and a housing in which the motor part, the deceleration mechanism, and the output part are housed, wherein the motor shaft and the output shaft are disposed away from each other in a radial direction of the motor shaft, wherein the housing has a housing main body having a polygonal shape in a plan view that opens to one side in the axial direction, and a lid member fixed to an opening on one side in the axial direction of the housing main body, wherein the output shaft is positioned at a first corner of the housing, wherein the lid member and the housing main body are fastened by a plurality of bolts that penetrate through the lid member in the axial direction, wherein the plurality of bolts include a plurality of corner bolts positioned at respective corners of the housing other than the first corner, and an intermediate position bolt positioned at the intermediate between the first corner and a second corner adjacent to the first corner, and wherein, in a plan view, the intermediate position bolt is positioned on the side of the planar center with respect to an edge connecting the first corner and the second corner and on the side of an outer edge with respect to an imaginary line connecting the center of the output shaft and the second corner.

According to an embodiment of the present disclosure, an electric actuator having a reduced planar size is provided.

DESCRIPTION OF THE EMBODIMENTS

Figure 1:
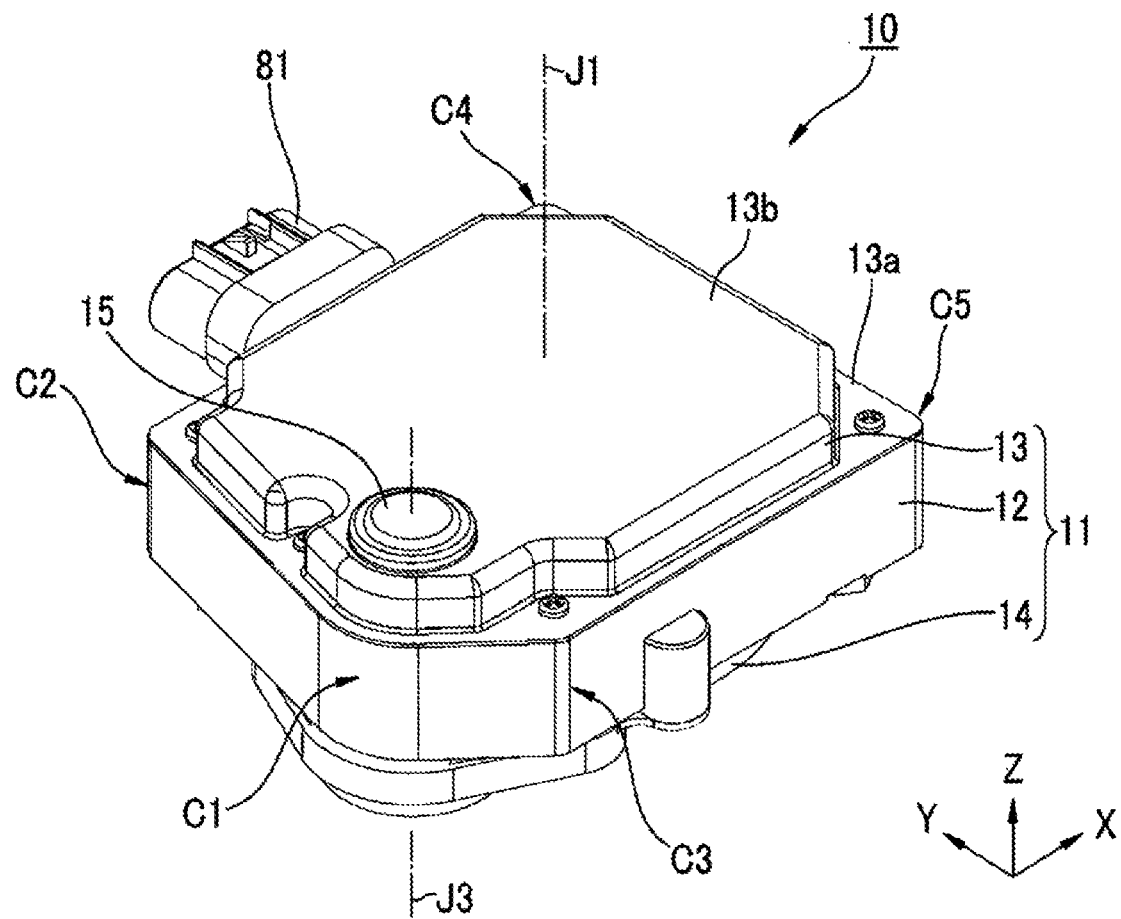
FIG. 1 is a perspective view of an electric actuator of an embodiment.

In the drawings, the Z axis direction is an up and down direction in which the positive side is upward, and the negative side is downward. The axial direction of the central axis J1, which is a virtual axis appropriately shown in the drawings, is parallel to the Z axis direction, that is, the up and down direction. The X axis direction is a direction orthogonal to the Z axis direction. The Y axis direction is a direction orthogonal to both the Z axis direction and the X axis direction. In the following description, a direction parallel to the axial direction of the central axis J1 will be simply referred to as "axial direction Z," a direction parallel to the X axis direction will be referred to as "first direction X," and a direction parallel to the Y axis direction will be referred to as "second direction Y." In addition, unless otherwise noted, a radial direction with respect to the central axis J1 will be simply referred to as "radial direction," and a circumferential direction with respect to the central axis J1 will be simply referred to as "circumferential direction."

In the present embodiment, the upper side corresponds to one side in the axial direction. In the present embodiment, a plan view means that observation is performed from above or below in the axial direction. Here, the upper side and the lower side are names for simply describing relative positional relationships between respective parts, and actual disposition relationships and the like may be disposition relationships and the like other than the disposition relationships and the like indicated by such names.

Figure 2:
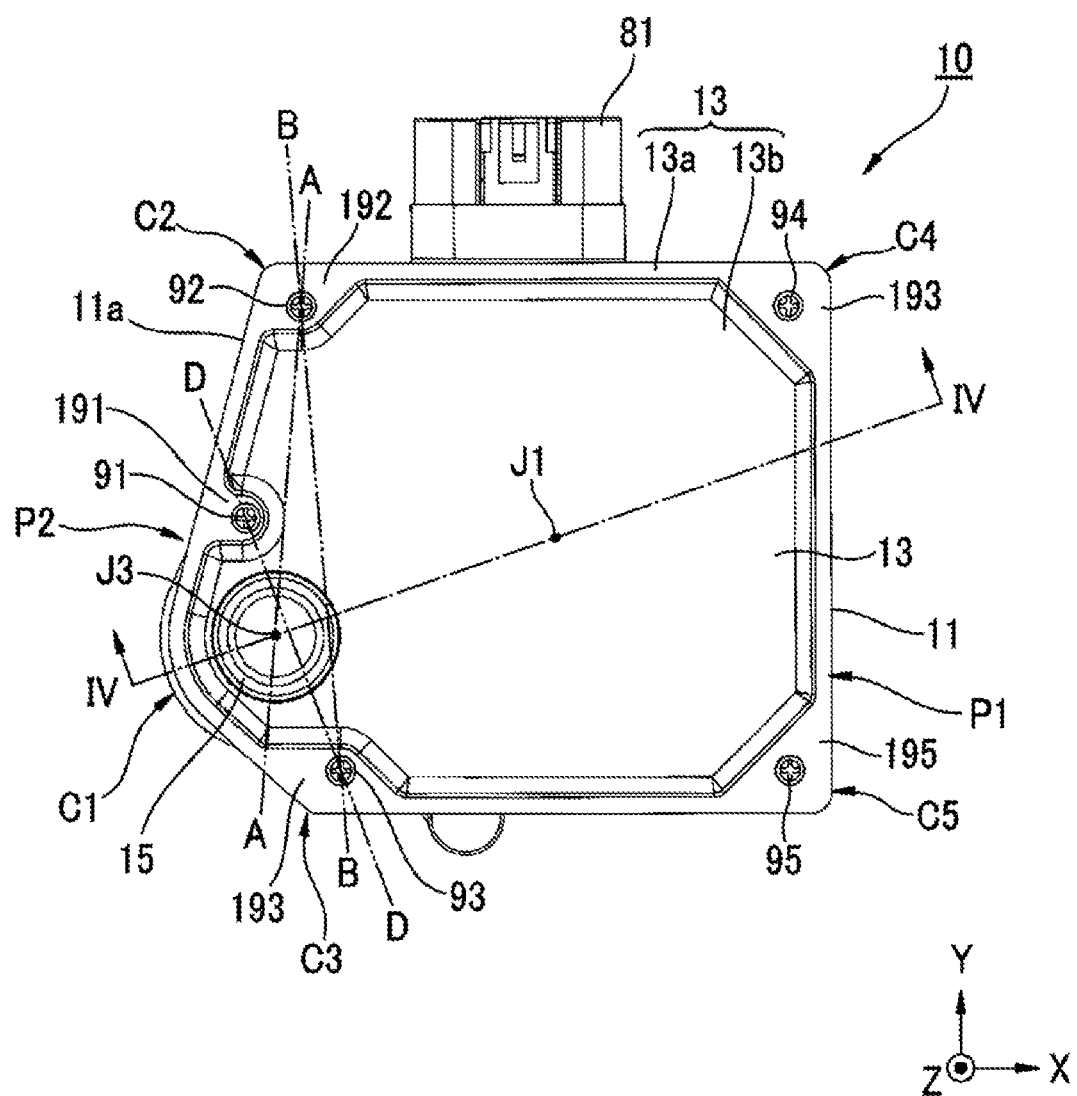
FIG. 2 is a plan view of the electric actuator of the embodiment.
Figure 3:
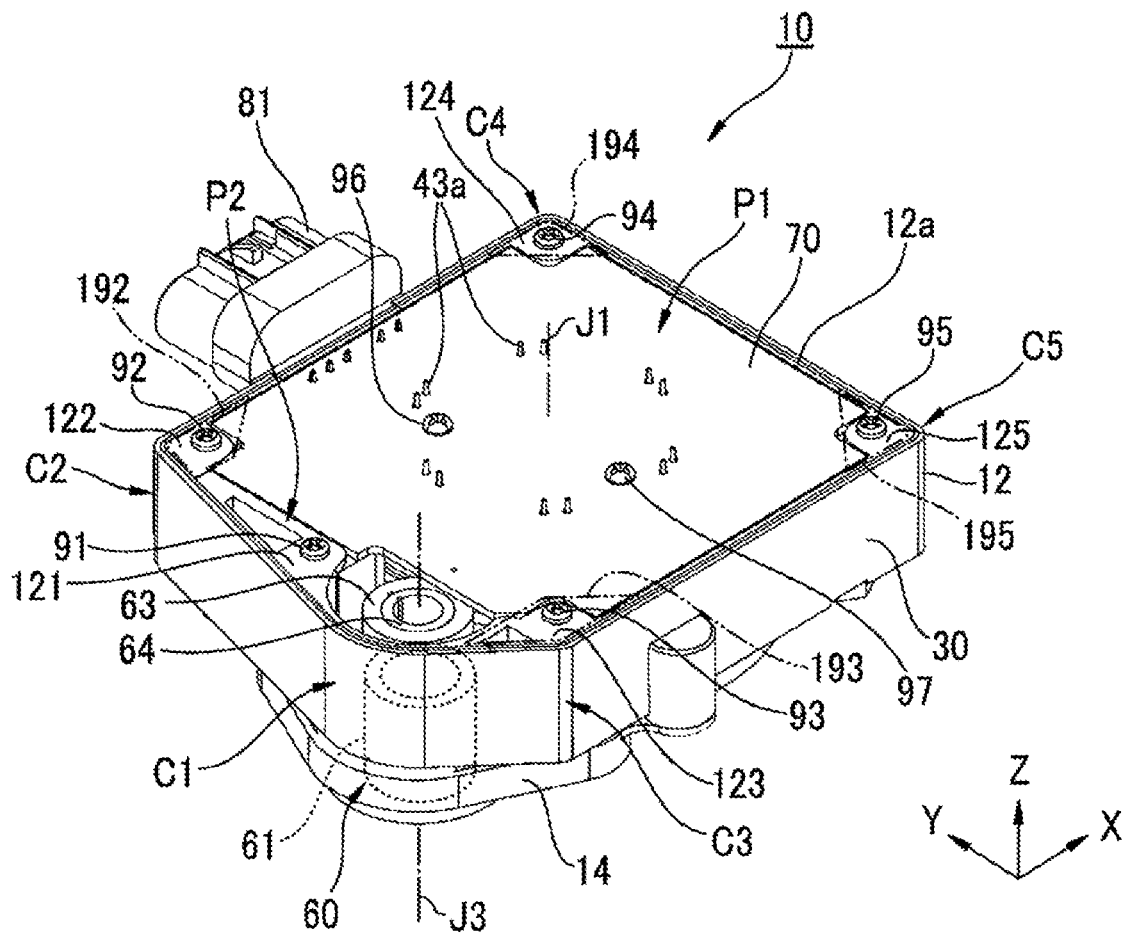
FIG. 3 is a perspective view showing a state in which a lid member is removed.
Figure 4:
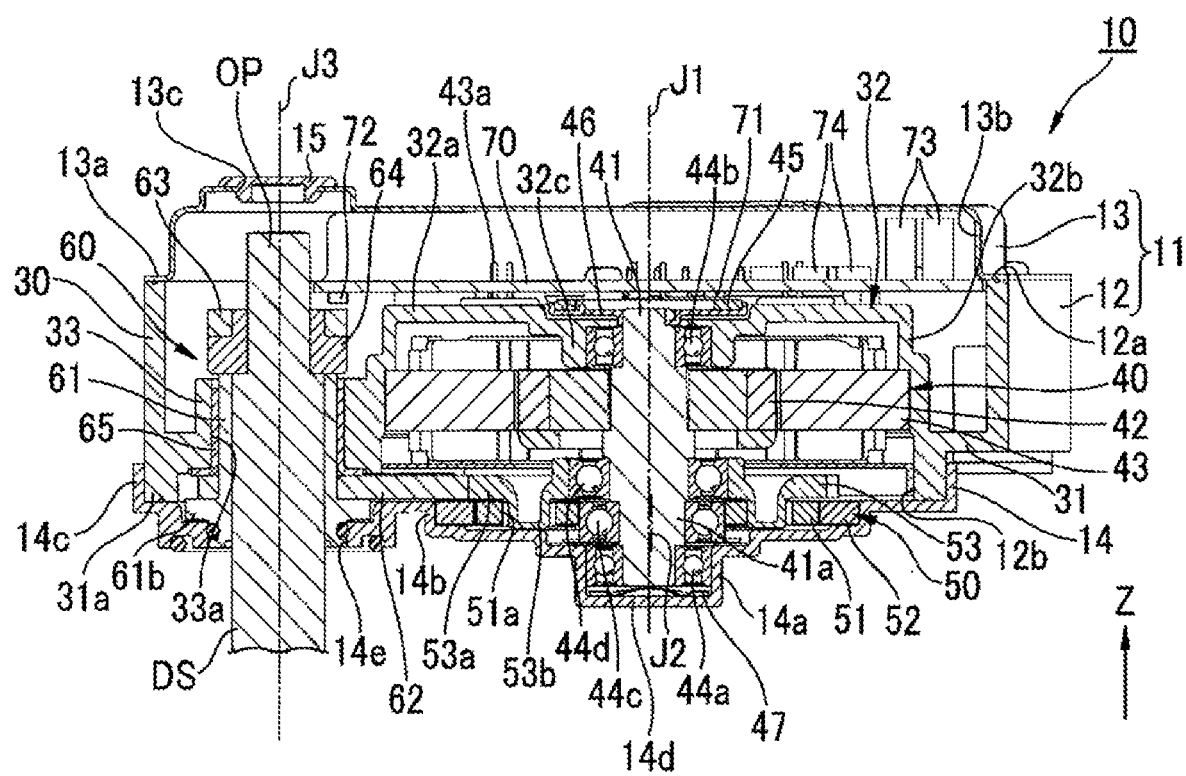
FIG. 4 is a cross-sectional view of the electric actuator taken along the line IV-IV in FIG. 2.

An electric actuator 10 of the present embodiment shown in FIG. 1 to FIG. 4 is attached to a vehicle. More specifically, the electric actuator 10 is mounted in a shift-by-wire type actuator device that is driven based on a shift operation of a driver of a vehicle. As shown in FIG. 4, the electric actuator 10 includes a motor part 40, a deceleration mechanism 50, an output part 60, a circuit board 70, and a housing 11.

The motor part 40 has a motor shaft 41, a first bearing 44a, a second bearing 44b, a third bearing 44c, a fourth bearing 44d, a rotor main body 42, a stator 43, a sensor magnet for a motor part 45, and a magnet holder 46. The motor shaft 41 extends in the axial direction Z.

The first bearing 44a, the second bearing 44b, the third bearing 44c, and the fourth bearing 44d rotatably support the motor shaft 41 around the central axis J1. In the present embodiment, the first bearing 44a, the second bearing 44b, the third bearing 44c, and the fourth bearing 44d, are, for example, a ball bearing.

An eccentric shaft 41a which is a part supported by the third bearing 44c within the motor shaft 41 has a columnar shape that is parallel to the central axis J1 and extends with respect to an eccentric axis J2 which is eccentric with respect to the central axis J1. A part of the motor shaft 41 other than the eccentric shaft 41a is a columnar shape that extends around the central axis J1.

The rotor main body 42 is fixed to the motor shaft 41. The rotor main body 42 includes a rotor core fixed to the motor shaft 41 and a rotor magnet fixed to the outer circumferential part of the rotor core.

The stator 43 is disposed outward from the rotor main body 42 in the radial direction with a gap therebetween. The stator 43 is an annular shape surrounding the outside of the rotor main body 42 in the radial direction. The stator 43 includes, for example, a stator core, a plurality of insulators, and a plurality of coils. Each coil is installed on teeth of the stator core with an insulator therebetween.

The magnet holder 46 has a ring shape centered on the central axis J1. The magnet holder 46 is fixed to the outer circumferential surface at an upper side end of the motor shaft 41. The sensor magnet for a motor part 45 is a ring plate shape centered on the central axis J1. The plate surface of the sensor magnet for a motor part 45 is orthogonal to the axial direction Z. The sensor magnet for a motor part 45 is fixed to the outer circumferential edge in the radial direction within the upper surface of the magnet holder 46. Therefore, the sensor magnet for a motor part 45 is attached to the motor shaft 41 via the magnet holder 46. In the present embodiment, the sensor magnet for a motor part 45 faces a lower side surface of the circuit board 70 in the up and down direction with a gap therebetween.

The deceleration mechanism 50 is connected to the lower side of the motor shaft 41. The deceleration mechanism 50 is disposed below the rotor main body 42 and the stator 43. The deceleration mechanism 50 includes an external gear 51, an internal gear 52, and an output gear 53. Here, the deceleration mechanism 50 may be connected to the upper side of the motor shaft 41.

The external gear 51 has a ring plate shape that extends from the eccentric axis J2 of the eccentric shaft 41a as the center in the radial direction of the eccentric axis J2. A gear part is provided on the outer surface of the external gear 51 in the radial direction. The external gear 51 is connected to the motor shaft 41 via the third bearing 44c. Therefore, the deceleration mechanism 50 is connected to the motor shaft 41. The external gear 51 is fitted to the outer ring of the third bearing 44c from the outside in the radial direction. Therefore, the third bearing 44c connects the motor shaft 41 and the external gear 51 relatively rotatably around the eccentric axis J2.

The external gear 51 has a plurality of holes 51a that penetrate through the external gear 51 in the axial direction Z. The plurality of holes 51a are disposed at regular intervals along one circumference in the circumferential direction with respect to the eccentric axis J2. The shape when viewed in the axial direction Z of the hole 51a is circular.

The internal gear 52 surrounds the outside of the external gear 51 in the radial direction. A gear part of the internal gear 52 is engaged with a gear part of the external gear 51. The internal gear 52 has a ring shape centered on the central axis J1. The outer circumferential part of the internal gear 52 is, for example, a polygonal shape such as a regular dodecagon, and is fixed to a second lid member 14 to be described below in a rotationally fixed state.

The output gear 53 includes an output gear main body 53a and a plurality of pins 53b. The output gear main body 53a is disposed below the external gear 51 and the internal gear 52. The output gear main body 53a has a ring plate shape that extends in the radial direction with respect to the central axis J1. A gear part is provided on the outer surface of the output gear main body 53a in the radial direction. The output gear main body 53a is connected to the motor shaft 41 via the fourth bearing 44d.

The plurality of pins 53b have a cylindrical shape that protrudes upward from the upper surface of the output gear main body 53a. The plurality of pins 53b are disposed at regular intervals along one circumference in the circumferential direction. The outer diameter of the pin 53b is smaller than the inner diameter of the hole 51a. The plurality of pins 53b pass through the plurality of holes 51a respectively from above. The outer circumferential surface of the pin 53b is inscribed in the inner circumferential surface of the hole 51a. The inner circumferential surface of the hole 51a supports the external gear 51 in a swinging manner around the central axis J1 via the pin 53b.

The output part 60 is a part that outputs a driving force of the electric actuator 10. The output part 60 is disposed outward from the motor part 40 in the radial direction. The output part 60 includes an output shaft 61, a drive gear 62, a sensor magnet for an output part 63, and a magnet holder 64.

The output shaft 61 has a cylindrical shape that extends in the axial direction Z of the motor shaft 41. In this manner, since the output shaft 61 extends in the same direction as the motor shaft 41, the structure of the deceleration mechanism 50 that transmits rotation of the motor shaft 41 to the output shaft 61 can be simplified. In the present embodiment, the output shaft 61 has a cylindrical shape centered on an output central axis J3 which is a virtual axis. The output central axis J3 is parallel to the central axis J1 and is provided away from the central axis J1 in the radial direction. That is, the motor shaft 41 and the output shaft 61 are disposed away from the motor shaft 41 in the radial direction.

The output shaft 61 opens to both sides in the axial direction. The output shaft 61 has a spline groove (not shown) on the inner circumferential surface. The output shaft 61 is disposed at a position overlapping the rotor main body 42 in the radial direction of the motor shaft 41. A driven shaft DS is inserted into and connected to the output shaft 61 from below. More specifically, a spline part provided on the outer circumferential surface of the driven shaft DS is fitted to the spline groove provided on the inner circumferential surface of the output shaft 61, and thereby the output shaft 61 and the driven shaft DS are connected. A driving force of the electric actuator 10 is transmitted to the driven shaft DS via the output shaft 61. Therefore, the electric actuator 10 rotates the driven shaft DS around the output central axis J3.

The drive gear 62 is fixed to the output shaft 61 and engaged with the output gear 53. In the present embodiment, the drive gear 62 is fixed to the outer circumferential surface of the output shaft 61. The drive gear 62 extends from the output shaft 61 toward the output gear 53. The drive gear 62 is a fan-shaped gear in a plan view. The drive gear 62 has a gear part at an end on the side of the output gear 53. The gear part of the drive gear 62 is engaged with the gear part of the output gear 53.

The magnet holder 64 is a substantially cylindrical member that extends in the axial direction Z with respect to the output central axis J3 as the center. The magnet holder 64 opens to both sides in the axial direction. The magnet holder 64 is disposed above the output shaft 61. In the case of the present embodiment, the magnet holder 64 is disposed outward from the fourth bearing 44d of the motor part 40 in the radial direction. The magnet holder 64 partially overlaps the circuit board 70 when viewed in the axial direction Z.

The magnet holder 64 is disposed below the circuit board 70. An upper end of the driven shaft DS is press-fitted by penetrating through the magnet holder 64 in the axial direction Z. Therefore, the magnet holder 64 is fixed to the driven shaft DS.

The sensor magnet for an output part 63 has a ring shape centered on the output central axis J3. The sensor magnet for an output part 63 is fixed to an outer circumferential part of the upper surface of the magnet holder 64. When the magnet holder 64 is fixed to the driven shaft DS, the sensor magnet for an output part 63 is fixed to the driven shaft DS via the magnet holder 64. The sensor magnet for an output part 63 faces a lower side surface of the circuit board 70 with a gap therebetween.

An upper end of the driven shaft DS protrudes to the side above the magnet holder 64. The upper end of the driven shaft DS passes through a side end surface of the circuit board 70 and protrudes above the circuit board 70. An operation unit OP capable of fitting to a tool is provided at the upper end of the driven shaft DS. The operation unit OP has, for example, a quadrangular columnar shape or a hexagonal columnar shape that extends in the output central axis J3.

When the motor shaft 41 rotates around the central axis J1, the eccentric shaft 41a revolves in the circumferential direction with respect to the central axis J1 as the center. Revolving of the eccentric shaft 41a is transmitted to the external gear 51 via the third bearing 44c. The external gear 51 swings while a position at which the inner circumferential surface of the hole 51a and the outer circumferential surface of the pin 53b are inscribed is changed. Therefore, a position at which the gear part of the external gear 51 and the gear part of the internal gear 52 are engaged changes in the circumferential direction. Therefore, a rotation force of the motor shaft 41 is transmitted to the internal gear 52 via the external gear 51.

Here, in the present embodiment, since the internal gear 52 is fixed, it does not rotate. Therefore, due to a reaction force of a rotation force transmitted to the internal gear 52, the external gear 51 rotates around the eccentric axis J2. In this case, a direction in which the external gear 51 rotates is opposite to a direction in which the motor shaft 41 rotates. Rotation of the external gear 51 around the eccentric axis J2 is transmitted to the output gear 53 via the hole 51a and the pin 53b. Therefore, the output gear 53 rotates around the central axis J1. The rotation of the motor shaft 41 is decelerated and then transmitted to the output gear 53.

When the output gear 53 rotates, the drive gear 62 engaged with the output gear 53 rotates around the output central axis J3. Therefore, the output shaft 61 fixed to the drive gear 62 rotates around the output central axis J3. In this manner, rotation of the motor shaft 41 is transmitted to the output shaft 61 via the deceleration mechanism 50.

The circuit board 70 is disposed above the motor part 40 and the output part 60. The circuit board 70 has a plate shape of which a plate surface is orthogonal to the axial direction Z. The shape of the circuit board 70 when viewed in the axial direction Z is a substantially square shape as shown in FIG. 3. Four corners of the circuit board 70 are cut into a rectangular shape. The circuit board 70 is connected to a lead wire 43a drawn upward from the coil of the stator 43. That is, the circuit board 70 is electrically connected to the motor part 40.

As shown in FIG. 4, a motor part sensor 71 is fixed to a lower surface of the circuit board 70. More specifically, the motor part sensor 71 is fixed to a part of the lower side surface of the circuit board 70 facing the sensor magnet for a motor part 45 in the axial direction Z with a gap therebetween. The motor part sensor 71 is a magnetic sensor that detects a magnetic field of the sensor magnet for a motor part 45. The motor part sensor 71 is, for example, a Hall element. In the present embodiment, three motor part sensors 71 are provided in the circumferential direction. When the motor part sensor 71 detects a magnetic field of the sensor magnet for a motor part 45, a rotation position of the sensor magnet for a motor part 45 is detected and rotation of the motor shaft 41 is detected.

An output part sensor 72 is fixed to the lower surface of the circuit board 70. More specifically, the output part sensor 72 is fixed to a part of the lower side surface of the circuit board 70 facing the sensor magnet for an output part 63 in the axial direction Z with a gap therebetween. The output part sensor 72 is a magnetic sensor that detects a magnetic field of the sensor magnet for an output part 63. The output part sensor 72 is, for example, a Hall element. Although not shown, for example, three output part sensors 72 are provided in the circumferential direction with respect to the output central axis J3. When the output part sensor 72 detects a magnetic field of the sensor magnet for an output part 63, a rotation position of the sensor magnet for an output part 63 is detected and rotation of the driven shaft DS is detected.

The motor part 40, the deceleration mechanism 50, the output part 60, and the circuit board 70 are housed in the housing 11. The housing 11 includes a housing main body 12 that opens upward and has a polygonal shape in a plan view, a first lid member 13 fixed to an opening 12a on the upper side of the housing main body 12, and the second lid member 14 fixed to an opening 12b on the lower side of the housing main body 12.

The housing main body 12 includes a rectangular cylindrical outer wall 30 constituting a case of the electric actuator 10, a bottom wall 31 that extends from a lower side end of the outer wall 30 to the inside in the radial direction, and a motor holding part 32 and an output shaft holding part 33 fixed to the bottom wall 31. In the present embodiment, the outer wall 30 has a pentagonal rectangular cylindrical shape when viewed in the axial direction Z. The opening on the upper side of the outer wall 30 is the opening 12a on the upper side of the housing main body 12. The bottom wall 31 has an opening that opens downward. A cylindrical wall 31a having a cylindrical shape that protrudes from the bottom wall 31 downward is provided on the periphery of the opening of the bottom wall 31. The opening surrounded by the cylindrical wall 31a is the opening 12b on the lower side of the housing main body 12. The motor holding part 32 and the output shaft holding part 33 are fixed to the upper surface of the bottom wall 31.

The motor holding part 32 has a top wall 32a and has a cylindrical shape that opens downward. The motor holding part 32 holds the motor part 40 therein. The motor holding part 32 has the disc-like top wall 32a that extends in the radial direction and a cylindrical part 32b that extends from the outer side end of the top wall 32a in the radial direction downward. A lower end of the cylindrical part 32b is fixed to the bottom wall 31. The stator 43 of the motor part 40 is fixed to the inner circumferential surface of the cylindrical part 32b.

The motor holding part 32 has a bearing holding part 32c at the center of the top wall 32a when viewed in the axial direction Z. The bearing holding part 32c has a cylindrical shape that extends in the axial direction Z. The second bearing 44b is held on the inner circumferential surface of the bearing holding part 32c.

The deceleration mechanism 50 is disposed in the downward opening of the motor holding part 32. The second lid member 14 covers the deceleration mechanism 50 from below. In the present embodiment, the second lid member 14 is made of a metal. The second lid member 14 includes an inner cylindrical part 14a having a cylindrical shape centered on the central axis J1, an outer cylindrical part 14b having a rectangular cylindrical shape centered on the central axis J1, a fixed cylindrical part 14c fixed to the housing main body 12, a bottom wall 14d positioned at a lower side end of the inner cylindrical part 14a, and an opening 14e overlapping the output part 60 in the axial direction Z.

The inner cylindrical part 14a has a smaller inner diameter than the outer cylindrical part 14b and is positioned below the outer cylindrical part 14b. The first bearing 44a is held inside the inner cylindrical part 14a in the radial direction. Therefore, the motor shaft 41 is supported rotatably about its axis by the first bearing 44a held by the second lid member 14 and the second bearing 44b held by the motor holding part 32.

A preload member 47 is disposed between the first bearing 44a and the bottom wall 14d in the axial direction Z. That is, the electric actuator 10 includes the preload member 47. The preload member 47 is a ring-shaped wave washer that extends in the circumferential direction. The preload member 47 comes in contact with an upper side surface of the bottom wall 14d and a lower side end of the outer ring of the first bearing 44a. The preload member 47 applies an upward preload to the outer ring of the first bearing 44a.

The internal gear 52 is held inside the outer cylindrical part 14b in the radial direction. Therefore, the deceleration mechanism 50 is held on the bottom of the housing 11 via the second lid member 14. The fixed cylindrical part 14c is fixed to the outer circumferential surface of the cylindrical wall 31a of the housing main body 12. Therefore, the second lid member 14 is fixed to the housing main body 12.

The output shaft holding part 33 has a cylindrical shape that extends in the axial direction Z. A part of a side surface of the output shaft holding part 33 is fixed to a side surface of the motor holding part 32. A lower end of the output shaft holding part 33 is fixed to the bottom wall 31. The output shaft holding part 33 has a through-hole 33a that penetrates through the output shaft holding part 33 in the axial direction Z. A cylindrical bush 65 is fitted into the through-hole 33a.

The bush 65 has a flange part that protrudes outward in the radial direction with respect to the output central axis J3 as the center at its lower side end. The flange part of the bush 65 is supported on the drive gear 62 by the upper surface from below. The output shaft 61 is fitted into the inner side of the bush 65. The bush 65 rotatably supports the output shaft 61 around the output central axis J3. The output shaft 61 has a flange part 61b that extends from the outer circumferential surface of the output shaft 61 to the outside in the radial direction. The flange part 61b is supported by the second lid member 14 from below. A lower side end of the output shaft 61 is exposed downward through the opening 14e of the second lid member 14.

As shown in FIG. 2 to FIG. 4, the circuit board 70 is housed in the opening 12a on the upper side of the housing main body 12. The first lid member 13 covering the circuit board 70 from above is attached to the opening 12a. The housing main body 12 and the first lid member 13 have a pentagonal shape when viewed in the axial direction Z. That is, the housing 11 and the housing main body 12 have a polygonal shape in a plan view, and the housing 11 and the housing main body 12 have a pentagonal shape in a plan view.

The housing 11 has five corners: a first corner C1, a second corner C2, a third corner C3, a fourth corner C4, and a fifth corner C5. In the case of the present embodiment, the outer edge of the first lid member 13 overlaps the outer edge of the housing main body 12 when viewed in the axial direction Z. The shape of the first lid member 13 may be a shape different from the outer edge shape of the housing main body 12.

As shown in FIG. 3, the housing main body 12 has a square part P1 in which the circuit board 70 having a substantially square shape is housed and a triangular part P2 that protrudes laterally from one side of the square part P1. The square part P1 is a part having a substantially square shape that connects the second corner C2, the fourth corner C4, the fifth corner C5, and the third corner C3 in that order. The triangular part P2 is a part having a triangular shape that connects the first corner C1, the second corner C2, and the third corner C3 in that order.

The circuit board 70 is disposed in a plane area positioned in the square part P1 within the plane area of the opening 12a. In the present embodiment, the circuit board 70 is fastened to the top wall 32a of the motor holding part 32 by two bolts 96 and 97 positioned at the central part when viewed in the axial direction Z.

Two sides of the circuit board 70 in the first direction X and one side in the second direction Y are respectively disposed close to two sides of the opening 12a in the first direction X and one side in the second direction Y. A part of the output part 60 is disposed in the triangular part P2 of the housing main body 12. More specifically, the output shaft 61, the sensor magnet for an output part 63, and the magnet holder 64 are disposed in a part of the first corner C1 that protrudes laterally from the square part P1 in the first direction X within the housing main body 12. That is, the output shaft 61 is positioned at the first corner C1 of the housing 11.

In this manner, when the output shaft 61 is disposed at a corner of the housing main body 12 having a polygonal shape when viewed in the axial direction Z, even if the motor shaft 41 and the output shaft 61 are disposed away from each other in the radial direction, it is easy to reduce the size of the entire electric actuator 10. Therefore, according to the present embodiment, the electric actuator 10 having a structure in which the motor shaft 41 and the output shaft 61 are disposed away from each other in the radial direction and of which the size in the radial direction can be reduced is obtained.

In addition, in the present embodiment, the fourth corner C4 and the fifth corner C5 have a right angle when viewed in the axial direction Z. That is, the first corner C1 in which the output shaft 61 is provided is a corner in which one side of a rectangle protrudes outward. According to this configuration, since the circuit board 70 can be disposed in an area having a rectangular shape in a plan view in which the output shaft 61 is not disposed within the housing main body 12, it is possible to secure a large area for the circuit board 70. When the circuit board 70 has a rectangular shape, restriction in mounting of electronic parts and the like is reduced. In addition, since the first corner C1 protrudes only in the first direction X, the length of the housing main body 12 in a direction along the second direction Y does not increase. Therefore, the housing 11 has a small size and has a shape that is easily installed in an external device.

As shown in FIG. 3, a part of the sensor magnet for an output part 63 and the magnet holder 64 is exposed to a plane area in which the circuit board 70 is not disposed within the opening 12a of the housing main body 12. According to this configuration, the tip of the driven shaft DS penetrating through the magnet holder 64 can be disposed on the side above the circuit board 70.

Support surfaces 121 to 125 supporting the first lid member 13 from below are provided in an area in which the circuit board 70, the sensor magnet for an output part 63, and the magnet holder 64 are not disposed at the upper side end of the housing main body 12. The support surfaces 121 to 125 are flat surfaces that extend in a direction orthogonal to the axial direction Z.

The first lid member 13 is a metal member having a container shape that opens downward. The first lid member 13 and the housing main body 12 are fastened by a plurality of bolts penetrating through the first lid member 13 in the axial direction. The plurality of bolts fastening the housing main body 12 and the first lid member 13 include an intermediate position bolt 91 that is positioned at the intermediate between the first corner C1 and the second corner C2 adjacent to the first corner C1, and a plurality of corner bolts 92 to 95 positioned at the second corner C2, the third corner C3, the fourth corner C4, and the fifth corner C5 of the housing 11 other than the first corner C1.

As shown in FIG. 1 and FIG. 4, the first lid member 13 has a flat part 13a having a frame shape that extends along the opening 12a of the housing main body 12 and a housing recess 13b that is positioned inside the flat part 13a and opens downward. In the case of the present embodiment, the first lid member 13 is made of a sheet metal and an upper surface of the first lid member 13 in a part in which the housing recess 13b is provided protrudes above the flat part 13a. When the housing recess 13b is provided, the rigidity of the first lid member 13 increases.

As shown in FIG. 4, electronic parts mounted on the upper surface of the circuit board 70 and the operation unit OP of the driven shaft DS are housed in the housing recess 13b. For example, a capacitor 73 and a transistor 74 are housed in the housing recess 13b.

A through-hole (not shown) through which a bolt fastening the first lid member 13 and the housing main body 12 passes is provided in the flat part 13a. As shown in FIG. 3, the flat part 13a is disposed on the upper surface of the support surfaces 121 to 125 positioned in the opening 12a. The intermediate position bolt 91 and the corner bolts 92 to 95 are screwed into screw holes provided in the support surfaces 121 to 125.

As shown in FIG. 2, the flat part 13a of the first lid member 13 has wide parts 191 to 195 that extend inwardly from the outer edge of the first lid member 13 at positions of respective bolts. In the present embodiment, a boundary line between the wide part 191 around the intermediate position bolt 91 and the housing recess 13b has an arc shape that partially surrounds the intermediate position bolt 91. A boundary line between the wide part 192 around the corner bolt 92 at the second corner C2 and the housing recess 13b is a shape curved at the position of the corner bolt 92. A boundary line between the wide part 193 around the corner bolt 93 at the third corner C3 and the housing recess 13b has a shape curved at the position of the corner bolt 93. A boundary line between the wide part 194 around the corner bolt 94 at the fourth corner C4 and the housing recess 13b has a linear shape intersecting edges on both sides of the fourth corner C4 at approximately 45°. A boundary line between the wide part 195 around the corner bolt 95 at the fifth corner C5 and the housing recess 13b has a linear shape intersecting edges on both sides of the fifth corner C5 at approximately 45°.

As shown in FIG. 3, the wide parts 192 to 195 positioned at the second corner C2 to the fifth corner C5 of the housing 11 are disposed on support surfaces 122 to 125. A plane area of the wide parts 192 to 195 is larger than a plane area of the support surfaces 122 to 125 when viewed in the axial direction Z. Therefore, in the present embodiment, at the second corner C2 to the fifth corner C5 of the housing 11, the wide parts 191 to 195 and an end positioned at a corner of the circuit board 70 overlap in the axial direction Z.

According to this configuration, the outer edge part of the circuit board 70 can be inserted and fixed in the axial direction Z by the first lid member 13 and the housing main body 12. In addition, the central part of the circuit board 70 is fixed by the two bolts 96 and 97. Therefore, since the central part of the circuit board 70 is fixed and the position of the outer edge is restricted, it is possible to prevent the circuit board 70 from vibrating in the housing 11 during operation. As a result, vibration noise of the electric actuator 10 and failure of the circuit board 70 are reduced. In addition, the circuit board 70 can be stably fixed with a small number of bolts.

As shown in FIG. 2, when viewed in the axial direction Z, the intermediate position bolt 91 is positioned on the side of the center of the housing 11 with respect to an edge 11a connecting the first corner C1 and the second corner C2 and on the side of the outer edge of the housing 11 with respect to an imaginary line A connecting the output central axis J3 which is at the center of the output shaft 61 and the corner bolt 92 at the second corner C2. According to this configuration, no bolt is disposed at the first corner C1, and a fastening position of the intermediate position bolt 91 does not protrude outward from the first corner C1. Therefore, an increase in the size of the housing 11 is prevented. In addition, since the intermediate position bolt 91 is disposed near of the first corner C1, the sealability between the first lid member 13 and the housing main body 12 is better than when the vicinity of the first corner C1 is not fastened by a bolt.

In the present embodiment, when viewed in the axial direction Z, the output central axis J3 which is at the center of the output shaft 61 is positioned on the side of the outer edge of the housing 11 with respect to an imaginary line B connecting the corner bolt 92 at the second corner C2 and the corner bolt 93 at the third corner C3. According to this configuration, neither side part of the output shaft 61 in the second direction Y protrudes to the side of the housing 11 more than the first corner C1 in the first direction X. Therefore, the volume of the housing 11 can be reduced.

In the present embodiment, when viewed in the axial direction Z, the output central axis J3 which is at the center of the output shaft is positioned on the side of the outer edge of the housing 11 with respect to an imaginary line D connecting the corner bolt 93 at the third corner C3 and the intermediate position bolt 91. According to this configuration, the intermediate position bolt 91 does not protrude to the side of the housing 11 more than the output shaft 61. Therefore, an increase in the volume of the housing 11 due to the provision of the intermediate position bolt 91 is reduced.

In the present embodiment, the output shaft 61 is positioned on the side of the third corner C3 with respect to an intermediate position between the second corner C2 and the third corner C3. In addition, the intermediate position bolt 91 is positioned on the side of the first corner C1 with respect to an intermediate position between the first corner C1 and the second corner C2. According to this configuration, the intermediate position bolt 91 and the corner bolt 93 are disposed near the output shaft 61. Therefore, the sealability between the first lid member 13 and the housing main body 12 around the output shaft 61 can be improved.

The first lid member 13 has an opening 13c positioned on the upper side of the output shaft 61. A removable cap 15 is attached to the opening 13c. The cap 15 is made of, for example, rubber. When the cap 15 is removed, a tool can be connected to the operation unit OP via the opening 13c.

As shown in FIG. 1 and FIG. 2, the electric actuator 10 has a connector part 81 that protrudes outward from a side surface of the housing main body 12. The connector part 81 is a part to which an external device is connected. The external device is, for example, a power supply device configured to supply power to the motor part 40.

As shown in FIG. 2, the connector part 81 protrudes outward from the housing 11 when viewed in the axial direction Z. The connector part 81 has a cylindrical shape that opens to the tip side extending radially outward from the housing 11.

Applications of the electric actuator of the above embodiment are not particularly limited, and the electric actuator may be mounted in other devices other than vehicles. In addition, the above configurations can be appropriately combined within a range in which they are not mutually exclusive.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electric actuator comprising:
   a motor part having a motor shaft that extends in an axial direction;
   a deceleration mechanism that is connected to one side of the motor shaft in the axial direction or the other side in the axial direction;
   an output part having an output shaft to which rotation of the motor shaft is transmitted via the deceleration mechanism; and
   a housing in which the motor part, the deceleration mechanism, and the output part are housed,
   wherein the motor shaft and the output shaft are disposed away from each other in a radial direction of the motor shaft,
   wherein the housing has
   a housing main body having a polygonal shape in a plan view that opens to one side in the axial direction, and
   a lid member fixed to an opening on one side in the axial direction of the housing main body,
   wherein the output shaft is positioned at a first corner of the housing,
   wherein the lid member and the housing main body are fastened by a plurality of bolts that penetrate through the lid member in the axial direction,
   wherein the plurality of bolts include
   a plurality of corner bolts positioned at respective corners of the housing other than the first corner, and
   an intermediate position bolt positioned at the intermediate between the first corner and a second corner adjacent to the first corner, and
   wherein, in a plan view, the intermediate position bolt is positioned on the side of the center of the housing with respect to an edge connecting the first corner and the second corner and on the side of an outer edge of the housing with respect to an imaginary line connecting the center of the output shaft and the corner bolt at the second corner.

2. The electric actuator according to claim 1,
   wherein the housing has a third corner adjacent to the first corner, and
   wherein, in a plan view, the center of the output shaft is positioned on the side of an outer edge side of the housing with respect to an imaginary line connecting the corner bolt at the second corner and the corner bolt at the third corner.

3. The electric actuator according to claim 2,
   wherein, in a plan view, the center of the output shaft is positioned on the side of an outer edge of the housing with respect to an imaginary line connecting a corner bolt at the third corner and the intermediate position bolt.

4. The electric actuator according to claim 2,
   wherein the output shaft is positioned on the side of the third corner with respect to an intermediate position between the second corner and the third corner, and
   wherein the intermediate position bolt is positioned on the side of the first corner with respect to an intermediate position between the first corner and the second corner.

5. The electric actuator according to claim 3,
   wherein the output shaft is positioned on the side of the third corner with respect to an intermediate position between the second corner and the third corner, and
   wherein the intermediate position bolt is positioned on the side of the first corner with respect to an intermediate position between the first corner and the second corner.

6. The electric actuator according to claim 1, comprising a circuit board that is positioned at an opening of the housing main body,
   wherein the lid member has a flat part having a frame shape that extends along the opening of the housing main body and a housing recess that is positioned inside the flat part and opens to the other side in the axial direction,
   wherein the flat part has a wide part that extends inward from an outer edge of the lid member at a position of each of the bolts, and
   wherein the wide part and the circuit board overlap in the axial direction at a corner of the housing.

7. The electric actuator according to claim 1,
   wherein the housing has a pentagonal shape in a plan view, and has the first corner in which the output shaft is disposed, the second corner and a third corner adjacent to the first corner, a fourth corner adjacent to the second corner, and a fifth corner adjacent to the third corner and the fourth corner, and
   wherein the fourth corner and the fifth corner are formed at a right angle in a plan view.

* * * * *